(12) United States Patent
Scherer et al.

(10) Patent No.: US 11,654,444 B2
(45) Date of Patent: May 23, 2023

(54) SCREEN-TYPE SCREW CENTRIFUGE

(71) Applicant: Andritz Separation GmbH, Vierkirchen (DE)

(72) Inventors: Dieter Scherer, Vierkirchen (DE); Franziska Zhu, Vierkirchen (DE)

(73) Assignee: Andritz Separation GmbH, Vierkirchen (DE)

( * ) Notice: Subject to any disclaimer, the term of this patent is extended or adjusted under 35 U.S.C. 154(b) by 0 days.

(21) Appl. No.: 17/877,675

(22) Filed: Jul. 29, 2022

(65) Prior Publication Data

US 2023/0034543 A1 Feb. 2, 2023

(30) Foreign Application Priority Data

Aug. 2, 2021 (EP) .................................... 21189098

(51) Int. Cl.
*B01D 33/72* (2006.01)
*B01D 33/067* (2006.01)
*B04B 3/04* (2006.01)

(52) U.S. Cl.
CPC .............. *B04B 3/04* (2013.01); *B01D 33/067* (2013.01); *B01D 33/72* (2013.01)

(58) Field of Classification Search
CPC .......... B04B 3/04; B01D 33/067; B01D 33/72

USPC ........................................................ 210/374
See application file for complete search history.

(56) References Cited

U.S. PATENT DOCUMENTS

| 1,650,685 | A | 11/1927 | Behr |
| 2003/0234214 | A1 | 12/2003 | Mullins et al. |

FOREIGN PATENT DOCUMENTS

| DE | 39 09 793 A1 | 3/1989 |
| WO | WO 2015/123735 A1 | 8/2015 |

OTHER PUBLICATIONS

European Patent Office, English abstract for EP0388631A2, dated Jul. 14, 2022.

*Primary Examiner* — Hayden Brewster
(74) *Attorney, Agent, or Firm* — Cahn & Samuels, LLP (57) ABSTRACT

A screen-type screw centrifuge including a screw drive shaft, a screw hub, a hollow screw main body and a ring-shaped annular-gap cover. At least one axial access channel is formed radially between a screw main body circumferential wall and the annular-gap cover. Using a tool engagement portion of a tightening means, by which the screw main body is fixed to the screw hub with a first screw main body axial end portion thereof, is axially accessible from a second screw main body axial end portion.

16 Claims, 9 Drawing Sheets

Fig. 4 detail A

Fig. 7 detail B

SCREEN-TYPE SCREW CENTRIFUGE

This patent application claims priority to European Patent Office Application No. EP 21 189 098.3 filed on Aug. 2, 2021, which is hereby incorporated by reference.

I. FIELD OF THE INVENTION

The invention relates to a screen-type screw centrifuge.

II. BACKGROUND OF THE INVENTION

An example of a screen-type screw centrifuge is discussed in DE 39 09 793 A1.

III. SUMMARY OF THE INVENTION

It is an object of the invention to provide a screen-type screw centrifuge in which a screw main body is easier to mount and to dismount.

For this purpose, the invention provides a screen-type screw centrifuge including a screw drive shaft extending along an axial axis, a screw hub that is fixed, optionally detachably fixed, to an (for example a first) axial end of the screw drive shaft, a hollow screw main body having a first screw main body axial end portion and a second screw main body axial end portion and extending axially along the axial axis from its first to its second screw main body axial end portion in a direction opposite to a second axial end of the screw drive shaft and having a screw main body circumferential wall extending around the axial axis, wherein the hollow screw main body is detachably fixed at its first screw main body axial end portion to the screw hub by means of at least one tightening means (e.g., a clamping means) (for example, by means of a plurality of tightening means) by which the screw main body and the screw hub are tightened (e.g., clamped) against each other, and a ring-shaped annular-gap cover having a central opening (for example, a central receiving opening) for receiving a feed line (for example, a filling tube or filling line) for feeding material to be centrifuged (for example, a suspension to be centrifuged) into the interior of the screw main body and which extends from the screw main body circumferential wall to the central opening in order to cover an annular gap between the received feed line and the screw main body circumferential wall when the feed line is inserted into the opening. The at least one tightening means (for example, the respective tightening means) has a tool engagement portion facing the second screw main body axial end portion. Radially between the screw main body circumferential wall and the annular-gap cover, at least one axial access channel is formed, through which the tool engagement portion of the respective tightening means is axially accessible from the second screw main body axial end portion. For example, a respective axial access channel may be assigned to each tool engagement portion, through which the respective tool engagement portion of the respective tightening means is axially accessible from the second screw main body axial end portion. However, it is also possible, for example, that one (for example, a single) axial access channel is formed, extending annularly about the axial axis, through which the tool engagement portion of the respective tightening means is axially accessible from the second screw main body axial end portion.

In this application, the term "axial" respectively relates to the axial axis and is to be understood, for example, as extending parallel to the axial axis, and the term "radial", in this application, also respectively relates to the axial axis and is thus to be understood as being radial (e.g., perpendicular) to this axial axis.

By making the respective tool engagement portion axially accessible from the second screw main body axial end portion, which second screw main body axial end portion is disposed facing away from the screw drive shaft, the respective tightening means is easily accessible to a technician, so that the screw main body can be easily mounted and dismounted.

For example, the axial access channel has an axial access opening that is disposed radially between the annular-gap cover and the screw main body circumferential wall and that axially faces the second screw main body axial end portion and that is radially overlapped with the at least one tool engagement portion at least partially, for example completely. For example, the axial access channel is bounded, at least in part, radially on the inside by the annular-gap cover and radially on the outside by the screw main body circumferential wall.

For example, the respective tightening means is formed as an axial tightening means and the screw main body and the screw hub are placed axially one behind the other, optionally placed axially one against the other (for example, directly placed one against the other), and are axially tightened to one another by means of the respective axial tightening means, wherein optionally the respective axial tightening means is formed as a screw which includes a screw head by which the respective tool engagement portion is formed. The axial placing of one behind the other or the axial placing of one against the other, unless described as directly placed one behind the other or directly placed one against the other, also includes that between the screw main body and the screw hub further components may be axially interposed and/or axially sandwiched, as explained further below. For example, a screw main body annular flange is formed by and/or on the screw main body circumferential wall at the first axial end portion of the screw main body, which extends around the axial axis and via which the screw main body is detachably fixed at its first axial end portion to a hub annular flange of the screw hub, extending around the axial axis, wherein the screw main body annular flange and the hub annular flange (in the direction parallel to the axial axis) are placed axially one behind the other, optionally axially one against the other (for example, directly against each other) and are axially tightened to one another by the respective axial tightening means. The screw main body annular flange is formed, for example, as a screw main body annular flange extending radially inward with respect to the axial axis, and the hub annular flange is formed, for example, as a hub annular flange extending radially outward with respect to the axial axis.

For example, the hollow screw main body is formed in the shape of a hollow screw cone, wherein the first axial end portion is a small-diameter axial end portion of the screw cone and the second axial end portion is a large-diameter end portion of the screw cone.

For example, the annular-gap cover includes a hollow cylindrical or hollow conical cover body and/or is formed by a hollow cylindrical or hollow conical cover body including a cover circumferential wall extending around the axial axis, wherein the axial access channel is formed as an annular channel extending around the axial axis radially between the cover circumferential wall and the screw main body circumferential wall. However, the annular-gap cover may also include an annular plate extending around (or encircling) the axial axis. The hollow cylindrical or hollow conical cover body may constitute or form a filling distributor which defines the central opening and via which the material to be centrifuged (for example, the suspension) fed from the feed line received in the opening is distributed on the inner circumference (i.e., radially inside the screw main body circumferentially). Further, the annular-gap cover may also be partially formed by a material feed guide component (for example, suspension feed guide component), for example to be explained further below, which on its part may be part of a screw overall body formed by the screw main body and the material feed guide component. Such a material feed guide component may, for example, include a material accelerator (for example, suspension accelerator) which is formed by blades and by means of which the material to be centrifuged is accelerated radially from the inside to the outside. The material feed guide component is, for example, attached (for example, axially joined) to the first screw main body axial end portion, where components (as will be discussed further below) may be disposed axially between the screw main body and the material feed guide component.

The annular-gap cover (for example, the cover body serving as a filling distributor or the filling distributor) may, for example, include a cover annular flange extending around the axial axis, where the cover annular flange:
  is axially joined (for example directly joined) to the screw main body annular flange and/or to the hub annular flange and/or is placed axially between the screw main body annular flange and the hub annular flange, and
  is axially tightened together with the screw main body annular flange and the hub annular flange by means of the respective axial tightening means.

The screen-type screw centrifuge further includes, for example, a rotatably supported screen drum including a screen drum circumferential wall, by which the screw main body is surrounded around the axial axis and which is equipped (for example, on its radially inner circumferential wall side) with a screen means, and an adjusting annular disk, which may be separate, that extends around the axial axis and which is placed axially between the screw main body and the screw hub, optionally axially between the screw main body annular flange and the hub annular flange, and by means of which a radial gap between the screw main body and the screen drum circumferential wall is adjusted or adjustable, where the adjusting annular disk is axially tightened by means of the respective axial tightening means together with the screw main body and the screw hub, optionally together with the screw main body annular flange and the hub annular flange. The screen drum is, for example, non-rotatably connected to a drum drive shaft, which is for example configured as a hollow shaft and extends coaxially around the screw drive shaft. The radial gap is adjusted by selecting and using adjusting annular disks of different thicknesses.

The screen-type screw centrifuge further includes, for example, a separate, ring-shaped material feed guide component, which may be configured, for example, like the material feed guide component explained above and which optionally includes material guide fins (which constitute and/or are configured, for example, as pump impeller blades and/or pump impeller vanes), which extends around the axial axis and which is configured to guide the material to be centrifuged (for example, the suspension to be centrifuged) passing through the central opening to an outer side of the screw main body (for example, the screw overall body), where the material feed guide component is placed axially between the screw main body and the screw hub and is axially tightened together with the screw main body and the screw hub by means of the respective axial tightening means.

The material feed guide component may be placed, for example, between the screw main body annular flange and the hub annular flange. The material feed guide component may be placed, for example, between the adjusting annular disk and the screw hub. The material feed guide component may be placed, for example, between the adjusting annular disk and the hub annular flange. The material feed guide component may be placed, for example, between the cover annular flange and the screw hub. The material feed guide component may be placed, for example, between the cover annular flange and the hub annular flange.

The screen-type screw centrifuge further includes, for example, the feed line for feeding the material to be centrifuged (or the suspension to be centrifuged) into the interior of the screw main body, which is received in the central opening of the annular-gap cover, where optionally the feed line includes a feed line end portion which extends parallel to the axial axis and with which the feed line is received in the central opening of the annular-gap cover.

The invention further provides a screen-type screw centrifuge system having a screen-type screw centrifuge as described in this disclosure and having a U- or V-shaped holding member having a first leg and a second leg opposite thereto, which are interconnected via a base, where a holding piece is arranged on the first leg, optionally in a longitudinally central portion thereof, for attachment to a lifting device, optionally to a lifting crane device, and where a transverse distance between the two legs in the direction transverse to the longitudinal extension thereof is greater than a radial distance between an inner wall of the screw main body and an outer surface of the screen-type screw centrifuge at the axial level of the screw main body, so that the second leg can axially engage the interior of the screw main body from the second screw main body axial end portion, and at the same time the first leg can engage over the screen-type screw centrifuge to thereby be able to deposit the screw main body on the second leg for removal thereof from the screen-type screw centrifuge.

The invention further provides a method for dismounting a screw main body from a screen-type screw centrifuge as described in this disclosure or from a screen-type screw centrifuge of a screen-type screw centrifuge system as described in this disclosure including:
  axially inserting a tool into the screw main body from the second screw main body axial end portion thereof into engagement with the tool receiving portion of the respective tightening means,
  releasing the respective tightening means by means of the tool,
  axially removing the screw main body from the one end of the screw drive shaft and out of the screen-type screw centrifuge in a direction opposite to the second end of the screw drive shaft,
  wherein optionally the holding part is inserted with its second leg into the screw main body, where the first leg engages over the screw centrifuge, the screw main body is deposited on the second leg after the release of the respective tightening means, and the holding part with its second leg and the screw main body deposited thereon is moved axially from the first end of the screw drive shaft in the direction opposite to the second end of the screw drive shaft and thus the screw main body is axially removed from the screen-type screw centrifuge.

IV. BRIEF DESCRIPTION OF THE DRAWINGS

The invention is explained below by means of embodiment examples with reference to the drawings. These embodiment examples are not intended to limit the invention, but merely to explain to those skilled in the art possible ways of carrying out the invention. In the drawings, the same reference signs are used for the same components throughout all of their figures, in which.

V. DETAILED DESCRIPTION OF THE INVENTION

Figure 1:
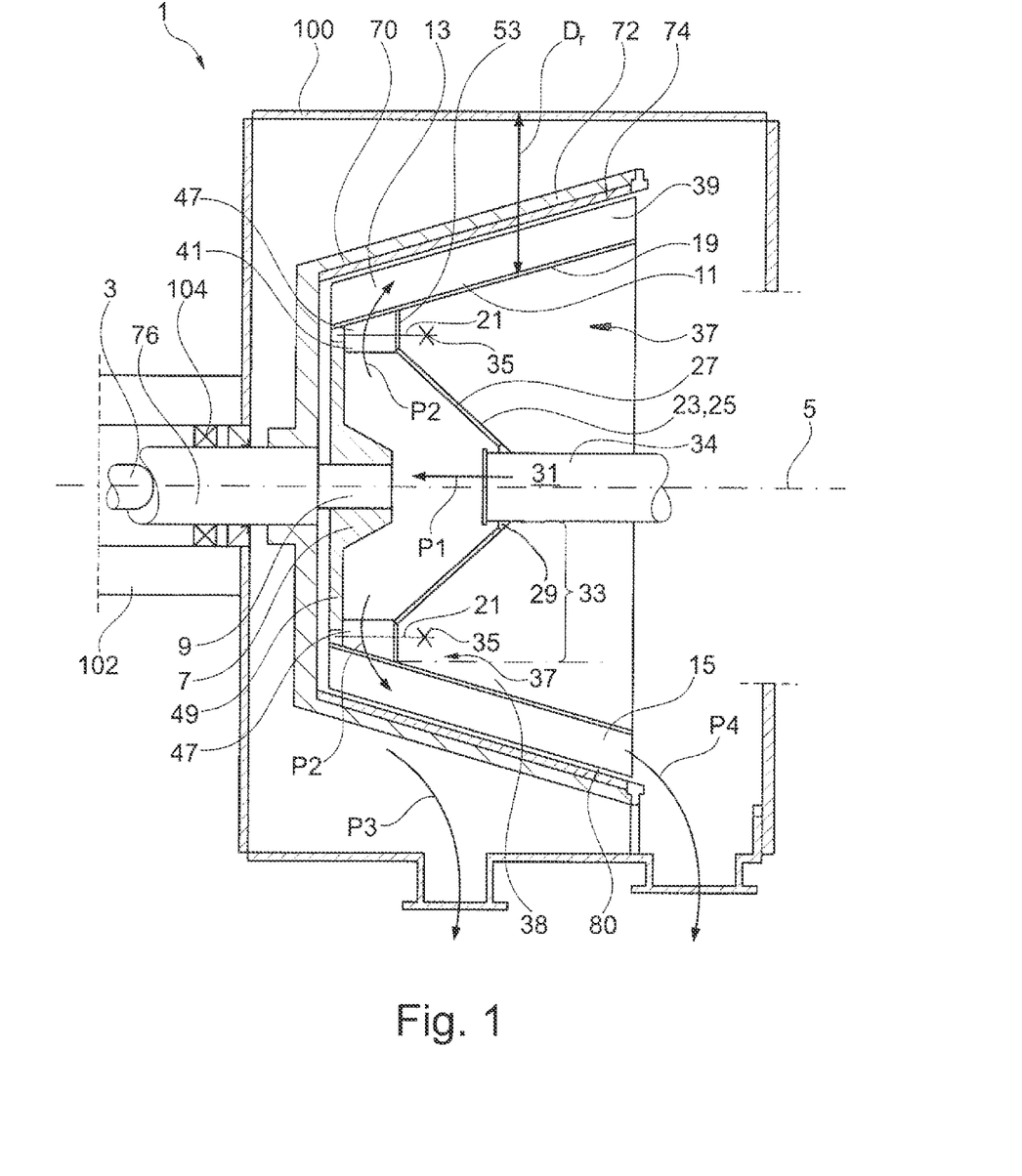
FIG. 1 shows a schematic longitudinal sectional view of a screen-type screw centrifuge according to an embodiment of the invention.
Figure 2:
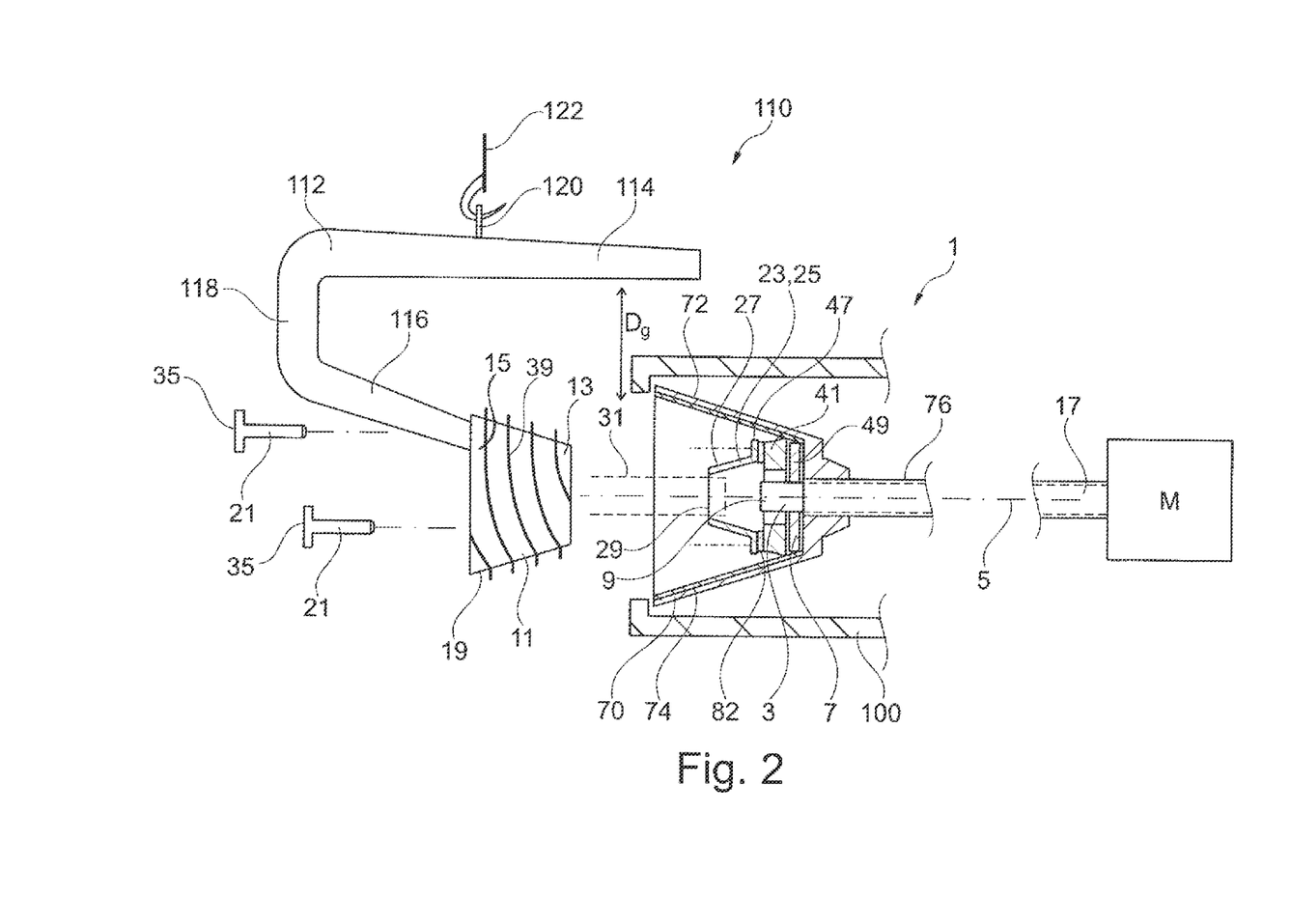
FIG. 2 shows a schematic longitudinal sectional view of a screen-type screw centrifuge with the screw main body dismounted, according to an embodiment of the invention.
Figure 3:
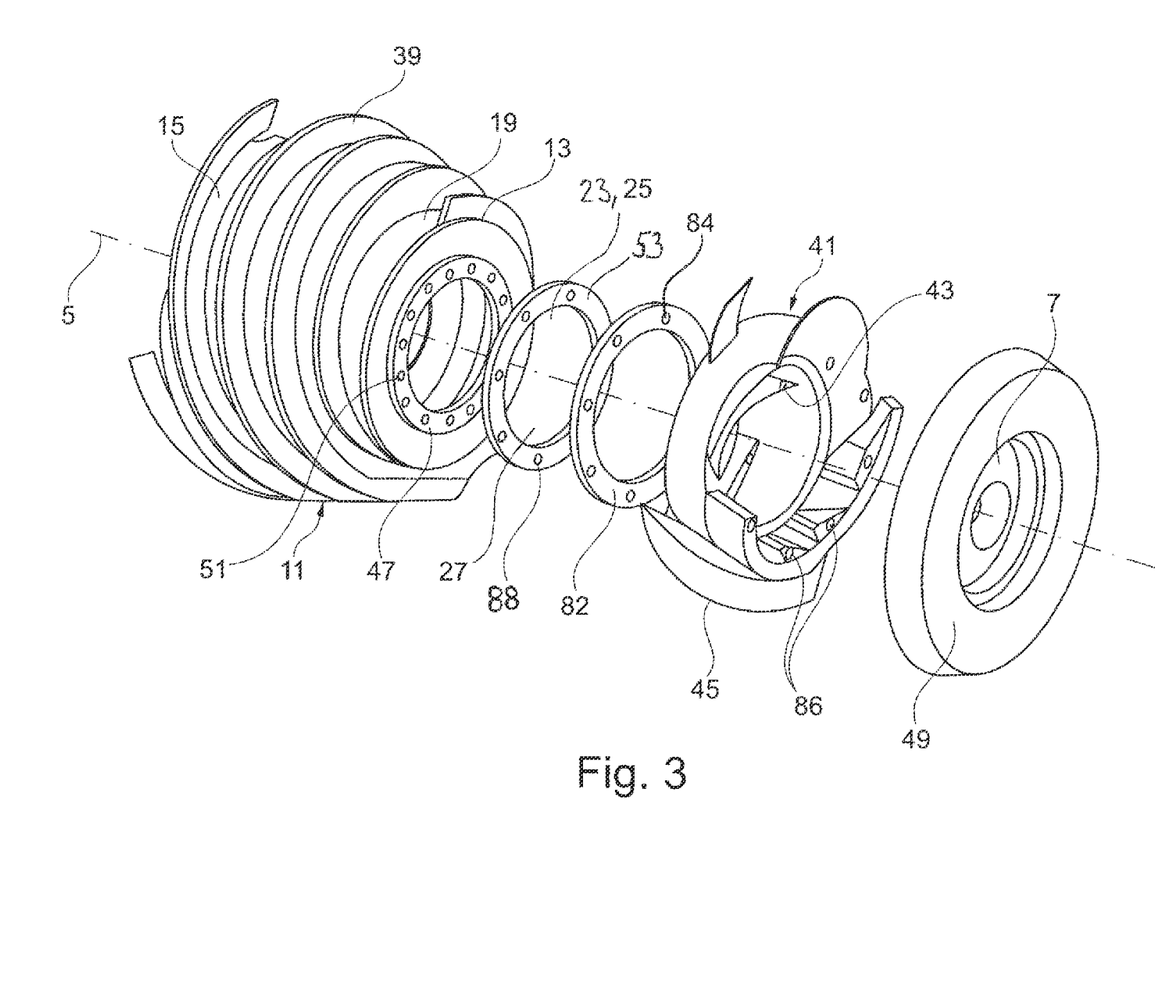
FIG. 3 shows a perspective exploded view of components making up a screw overall body, in conjunction with a screw hub of the screen-type screw centrifuge of FIG. 1.

According to the embodiments of FIGS. 1 to 3, a screen-type screw centrifuge 1 includes: a screw drive shaft 3 extending along an axial axis 5, a screw hub 7 fixed, optionally detachably fixed, to an axial end (for example, a first axial end) 9 of the screw drive shaft 3, a hollow screw main body 11 which has a first screw main body axial end portion 13 and a second screw main body axial end portion 15 and which extends axially along the axial axis 5 from its first axial end portion 13 to its second screw main body axial end portion 15 in the direction opposite to a second axial end 17 of the screw drive shaft 3 (with respect to the one axial end 9) and which includes a screw main body circumferential wall 19 extending around the axial axis 5, the hollow screw main body 11 being releasably fixed at its first screw main body axial end portion 13 to the screw hub 7 by means of at least one tightening means 21 (here by means of several tightening means 21), by which the screw main body 11 and the screw hub 7 are tightened against one another (here axially tightened against one another), a ring-shaped annular-gap cover 23 (here in the form of a cover body 25 configured/serving as a filling distributor with a conical circumferential wall 27), which has a central opening 29 for receiving a feed line (for example, a filling pipe or a filling tube) 31 for feeding material to be centrifuged (for example, a suspension to be centrifuged) in the direction of the arrow P1 into the interior of the screw main body 11 and which extends (for example, radially) from the screw main body circumferential wall 19 to the central opening 29, in order to cover an annular gap 33 between the received feed line 31 and the screw main body circumferential wall 19 when the feed line 31 is inserted into the opening 29. The feed line 31 is inserted into the central opening 29, for example, with a feed line end portion 34. The respective tightening means 21 has a tool engagement portion 35 facing the second screw main body axial end portion 15, and an axial access channel 37 is formed radially between the screw main body circumferential wall 19 and the annular-gap cover 23, through which the tool engagement portion 35 of the respective tightening means 21 is axially accessible from the second screw main body axial end portion 15. The axial access channel 37 has an axial access opening 38 which is radially disposed between the annular-gap cover 23 and the screw main body circumferential wall, and which axially faces the second screw main body axial end portion 15 and which is radially completely overlapped with the respective tool engagement portion 35.

The screw main body 11 is provided with a screw helix 39 on its radially outer side (or outer face). Furthermore, the screw main body 11 is formed in the shape of a hollow screw cone, wherein the first axial end portion 13 is a small-diameter axial end portion of the screw cone and the second axial end portion 15 is a large-diameter end portion of the screw cone.

The screen-type screw centrifuge 1 includes a separate, ring-shaped material feed guide component (for example, also called a filling lantern) 41, which includes, for example, material guide fins 43, which extends around the axial axis 5 and which is configured to guide the material to be centrifuged, passing through the central opening 29, to the outside of the screw main body 11 (see arrow P2 in FIG. 1). In the embodiment of FIGS. 2 and 3, the material feed guide component 41 is placed axially between the screw main body 11 and the screw hub 7 and is axially tightened together with the screw main body 11 and the screw hub 7 by means of the respective tightening means 21 provided as axial tightening means. Furthermore, in the embodiment of FIGS. 2 and 3, the material feed guide component 41 also includes a screw helix portion 45 on its outer side which, when assembled, mates with the screw helix 39 of the screw main body 11, so that an overall screw helix is formed. The material feed guide component 41 thus forms a hollow screw overall body together with the screw main body 11. The material guide fins 43 may further function as a radial accelerator and/or may be configured as such, by means of which the material to be centrifuged is accelerated radially from the inside to the outside to the outer side of the screw main body 11 and/or the screw overall body. For this purpose, the material guide fins 43 are formed, for example, in the form of pump impeller blades and/or pump impeller vanes.

In the embodiments of FIGS. 1 to 3, a screw main body annular flange 47 is formed by and/or on the screw main body circumferential wall 19 at the first axial end portion 13 of the screw main body 11, which extends around the axial axis 5 as well as radially inward and via which the screw main body 11 is detachably fixed at its first axial end portion 13 to a hub annular flange 49 of the screw hub 7, which extends around the axial axis 5 as well as radially outward, (by means of the respective tightening means 21), wherein the screw main body annular flange 47 and the hub annular flange 49 are placed axially one behind the other and are axially tightened with one another by the respective tightening means 21 acting as an axial tightening means. In the embodiment of FIG. 1, for example, the screw main body 11 and the material feed guide component 41 are formed as a single component, for example via welding, with the material feed guide component 41 at the same time forming the screw body annular flange 47.

The respective tightening means 21 is formed, for example, as a screw, and respective threaded holes are formed in the screw hub 7 (for example, in the hub annular flange 49) into which the tightening means 21 can be screwed, to thereby be able to screw the screw body 11 detachably to the screw hub 7. For this purpose, a number of first body through-holes 51 corresponding to the number of tightening means 21 are formed in the screw main body annular flange 47, through which the tightening means 21 extend axially.

In the embodiments of FIGS. 1 to 3, the annular-gap cover 23 and thus here the cover body 25 configured/serving as a filling distributor includes a cover annular flange (or filling distributor annular flange) 53 extending around the axial axis 5, the cover annular flange 53 being axially joined directly to the screw main body annular flange 47 and being axially joined to the hub annular flange 49, the cover annular flange 53 thus being axially placed between the screw main body annular flange 47 and the hub annular flange 49. Furthermore, the cover annular flange 53, in the assembled state, is axially tightened together with the screw main body annular flange 47 and the hub annular flange 49 by means of the respective axial tightening means 21.

The screen-type screw centrifuge 1 according to the embodiments of FIGS. 1 to 3 further includes a screen drum 70, here configured to be conical, which includes a screen drum circumferential wall 72, by which the screw main body 11 is surrounded around the axial axis 5 and which is equipped on its radially inner side with a screen means 74, for example a screen net. The screen drum 70 is non-rotatably attached to a drum drive shaft 76 and is rotatable by means of the latter. The drum drive shaft 76 is formed as a hollow shaft and is arranged coaxially around the screw drive shaft 3. For rotating the drum drive shaft 76 and for rotating the screw drive shaft 3, these are connected to a motor device M which includes, for example, for each of the drive shafts 3, 76, a respectively associated electric motor (not shown) which is connected to the associated drive shaft 3, 76 via a belt drive. In an optional embodiment, the associate electric motor directly engages the associated drive shaft 3, 76.

In filtration operation, the material (for example, the suspension) guided along arrow P2 to the outside of the screw main body 11 is separated by means of the filter means 74 into a filtrate, which passes through the filter means 74 and is discharged along arrow P3 (for example, via a filtrate discharge nozzle), and into a solid material remaining on the filter material 74, which is conveyed by means of the screw helix 39 axially further in the direction of the second screw main body axial end portion 15, in order to fall down there and be discharged along arrow P4.

In order to adjust a radial gap 80 between the conically shaped screen drum 70 and the conically shaped screw main body 11, the screen-type screw centrifuge 1 according to the embodiment of FIGS. 2 and 3 is equipped with an adjusting ring disk (or a spacer ring) 82 which extends around the axial axis 5 and which is placed axially between the screw main body 11 and the screw hub 7. More precisely, the adjusting ring disk 82 is here placed directly between the cover annular flange 53 and the material feed guide component 41. In the embodiment of FIG. 1, such an adjusting ring disk 82 is not yet inserted, but such an adjusting ring disk 82 can be axially interposed between, for example, the screw hub 7 and the material feed component 41 in the embodiment of FIG. 1, if necessary.

In the embodiment of FIGS. 2 and 3, the screw hub 7, the material feed guide component 41, the adjusting ring disk 82, the annular-gap cover 23, formed here as a cover body 25, which is configured/serves as a filling distributor, and the screw main body 11 are formed as separate components (i.e., separate from each other) which are placed directly against each other in this mentioned order. The adjusting ring disk 82 and the material feed guide component 41 are each provided with a number of disk through-holes 84 and guide component through-holes 86, respectively, corresponding to the number of tightening means 21, and the tightening means 21 extend through the body through-holes 51, the disk through-holes 84, the guide component through-holes 86 into the threaded holes (not shown) formed in the screw hub 7 (and/or in the hub annular flange 49 thereof), in order to thereby fix these aforementioned components axially to one another or to tighten them axially to one another. The combination thus obtained of the material feed guide component 41, the adjusting ring disk 82, the annular-gap cover 23, which is formed here as a cover body 25 which is formed/serves as a filling distributor, and the screw main body 11 may be regarded, for example, as a screw overall body which is fixed to the screw hub by means of the tightening means 21.

The size of the radial gap 80 can be adjusted by selecting the thickness of the adjusting ring disk 82.

As an alternative to the above-explained separate configuration of the components shown in FIG. 3, for example, the screw main body 11 and the material feed component 41 may be formed as one piece, and the annular-gap cover 23 (for example, the cover body 25 constituting the annular-gap cover 23) may be formed separately (thereto), or the annular-gap cover 23 (for example, the cover body 25 constituting the annular-gap cover 23) may be formed as one piece with the material supply component 41. Further, for example, the annular-gap cover 23 may be formed jointly by the cover body (and the filling distributor, respectively) 25 and the material feed component 41.

The screen-type screw centrifuge 1 according to the embodiments of FIGS. 1 to 3 further includes, for example, a receiving housing 100 in which, in the assembled state, the screen drum 70 and the screw overall body attached to the screw hub 7 are housed, and a machine frame 102 (see FIG. 1) to which the receiving housing 100 is attached and by which the drum drive shaft 76 and the screw drive shaft 3 are supported via pivot bearings 104 (see FIG. 1).

FIG. 2 further shows a screen-type screw centrifuge system 110 with the screen-type screw centrifuge 1 as described above and with a U- or V-shaped holding member 112 having a first leg 114 and a second leg 116 opposite thereto, which are connected to each other via a base 118, wherein on the first leg 114, in a longitudinally central portion thereof, a holding piece 120, for example in the form of a holding ring, is arranged for attachment to a lifting device 122, here for example in the form of a lifting crane device. A transverse distance $D_g$ between the two legs 114, 116 in a direction transverse to the longitudinal extension thereof is greater (for example, is greater in such a way) than a radial distance Dr between an inner wall of the screw main body 11 and an outer surface of the screen-type screw centrifuge 1 at an axial level of the screw main body 1 (see FIG. 1) so that, for example, the second leg 116 can axially engage the interior of the screw main body 11 from the second screw main body end portion 15, and at the same time the first leg 114 can engage over the screen-type screw centrifuge 1 to thereby be able to deposit the screw main body 11 on the second leg 116 for removal thereof from the screen-type screw centrifuge 1.

FIGS. 4-9 show further embodiments of a screen-type screw centrifuge 1 according to the invention, where the screen-type screw centrifuge 1 according to these further embodiments is configured substantially like the screen-type screw centrifuges 1 according to the embodiments of FIGS. 1 to 3, so that in the following mainly only the differences to these previous embodiments are described.

Figure 4:
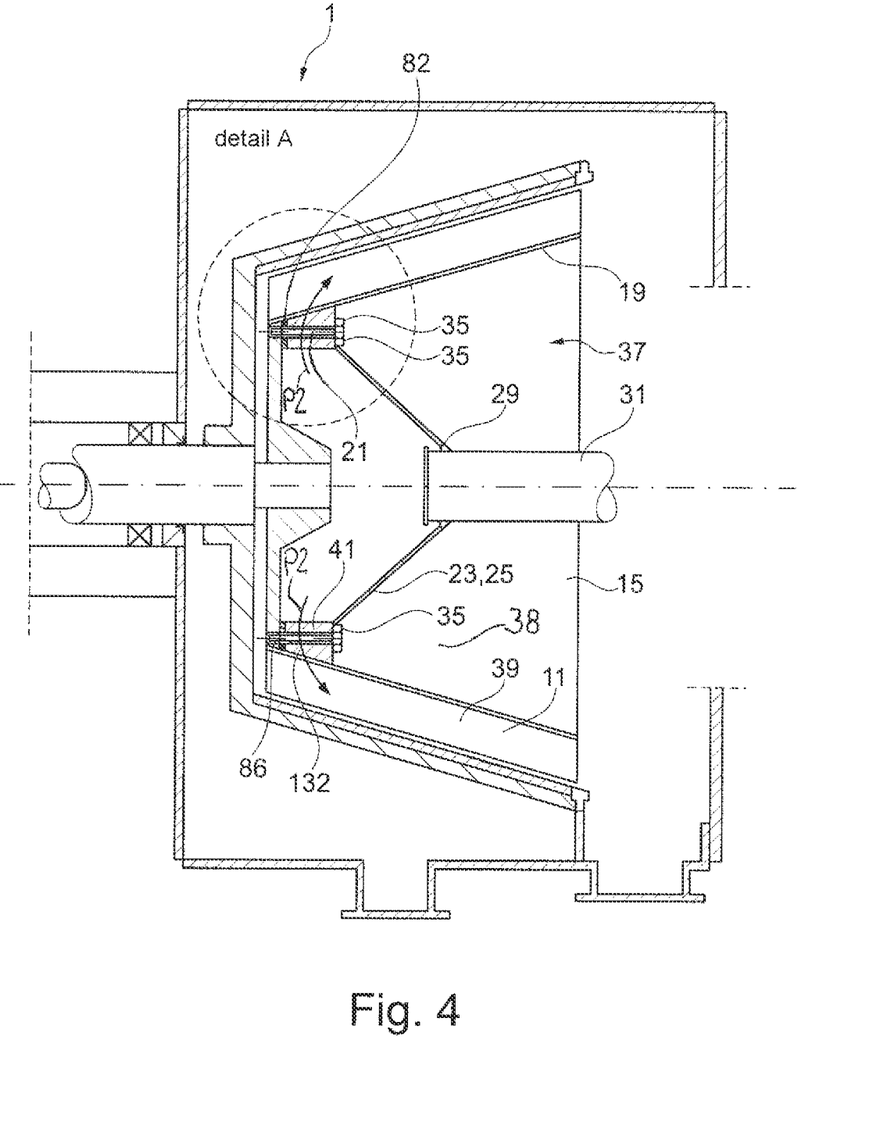
FIG. 4 shows a schematic longitudinal sectional view of a screen-type screw centrifuge according to another embodiment of the invention.
Figure 5:
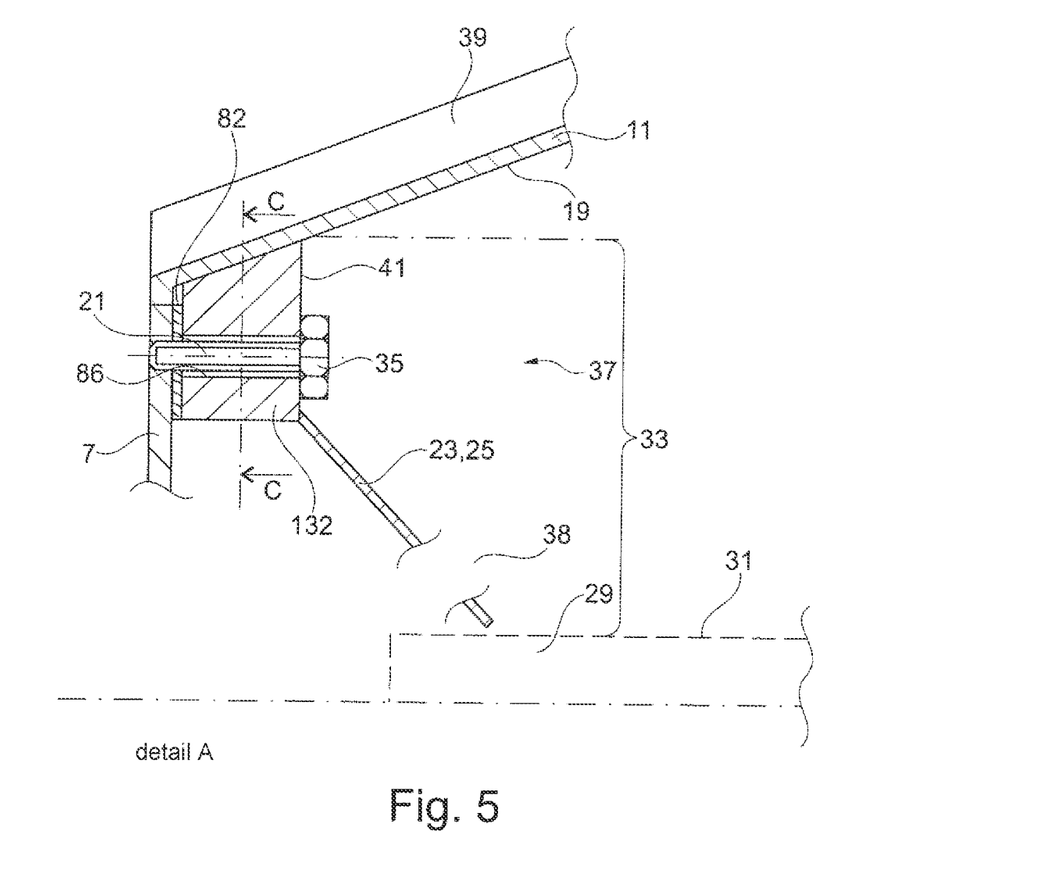
FIG. 5 shows an enlarged view of detail A of FIG. 4.
Figure 6:
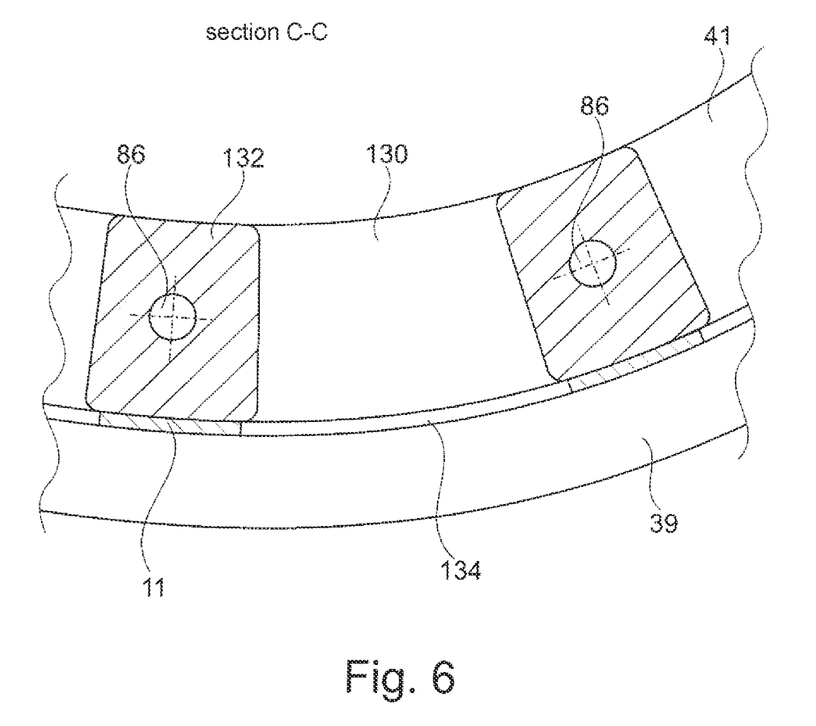
FIG. 6 shows a view along the line marked C-C in FIG. 5.

In the embodiment of FIGS. 4 to 6, the screw main body 11, the material feed component 41, the cover body (or the filling distributor) 25, which is equipped with the conical circumferential wall 27, are formed as a firmly coherent, non-separable structural unit, where, for example, the screw main body 11 covers the material feed component 41 radially on the outside; where, for example, the screw main body 11 and the material feed component 41 are welded to each other; and where, for example, the cover body (and the filling distributor, respectively) 25 is welded to the material feed component 41 or is produced (for example cast) with the latter as materially one piece.

In this embodiment of FIGS. 4 to 6, the annular-gap cover 23 is formed by the cover body (and the filling distributor, respectively) 25 together with the material feed component 41, which together axially cover the annular gap 33 between a/the material feed line 31 inserted in the opening 29 and the screw main body circumferential wall 19. The respective tightening means 21 is formed as a head screw, and the respective tool engagement portion 35 is located at the head of the head screw and is formed, for example, as an external hexagon (as shown in FIG. 5) or as a hexagon socket.

The material feed component 41 is formed as a ring component, and, as can be seen from the sectional view through the material feed component (for example, through the filling lantern) 41 shown in FIG. 6, radial apertures 130 are formed in the material feed component (and thus in the ring component) 41, which apertures are spaced circumferentially, for example at regular intervals, from one another and are bounded by interposed webs 132 of the material feed component 41. In the screw main body 11 extending, in this embodiment, radially thereabove, radial body apertures 134 are formed which extend, for example, between the walls of the screw helix 39 and which are radially aligned with the apertures 130 in the material feed component 41, so that the material to be centrifuged (or the suspension to be centrifuged) can pass from the inside to the outside of the screw main body 11. For example, the guide component through-holes 86 are formed in the webs 132, through which the tightening means 21 extend and/or can extend axially.

The adjusting ring disk 82 is located between the screw hub 7 and the material feed component 41.

The axial access channel 37 with its axial access opening 38 facing the second screw body axial end portion is formed radially between the screw main body circumferential wall 19 and the annular-gap cover 23 as a continuous annular channel, so that the tool engagement portion 35 of the respective tightening means 21 is axially accessible from the second screw main body axial end portion 15.

Figure 7:
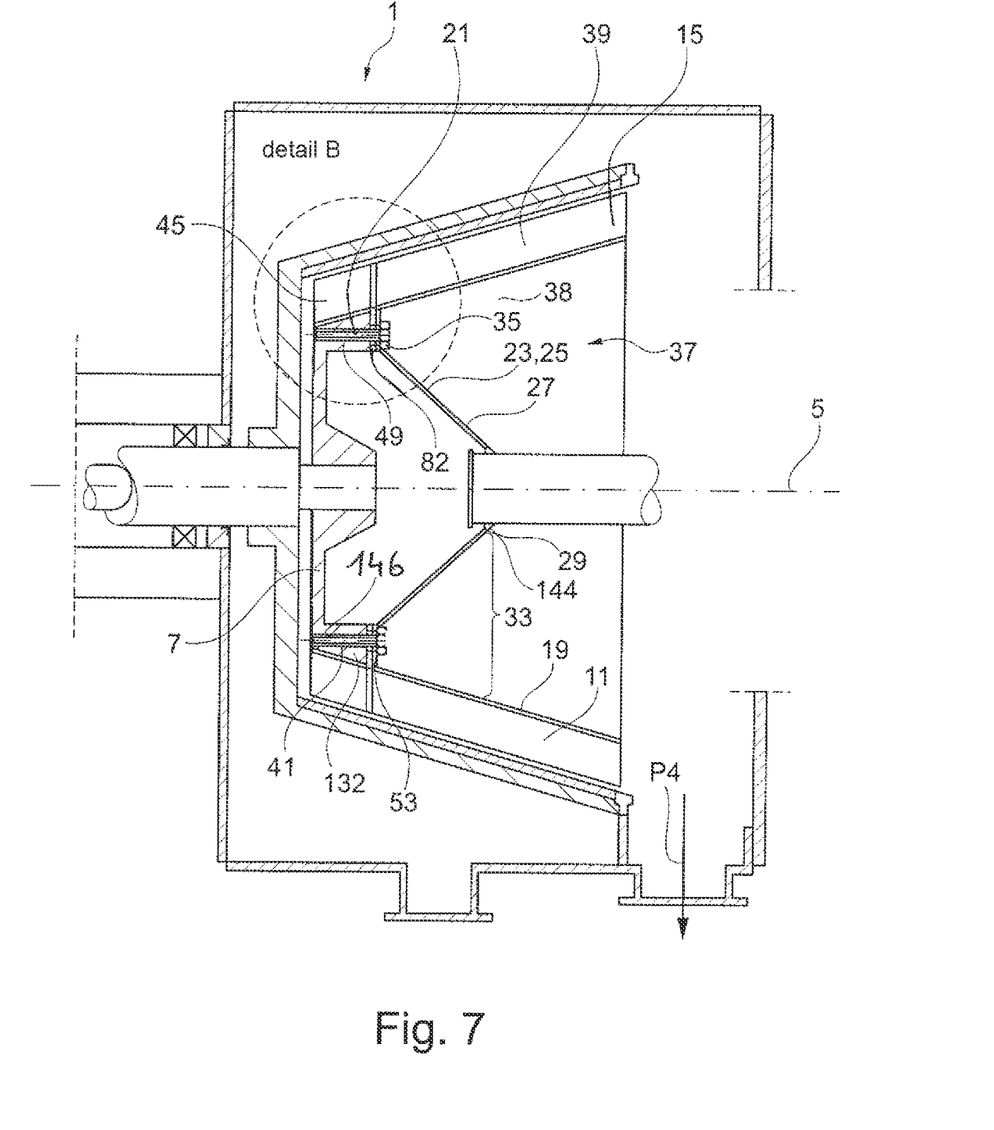
FIG. 7 shows a schematic longitudinal sectional view of a screen-type screw centrifuge according to yet another embodiment of the invention.
Figure 8:
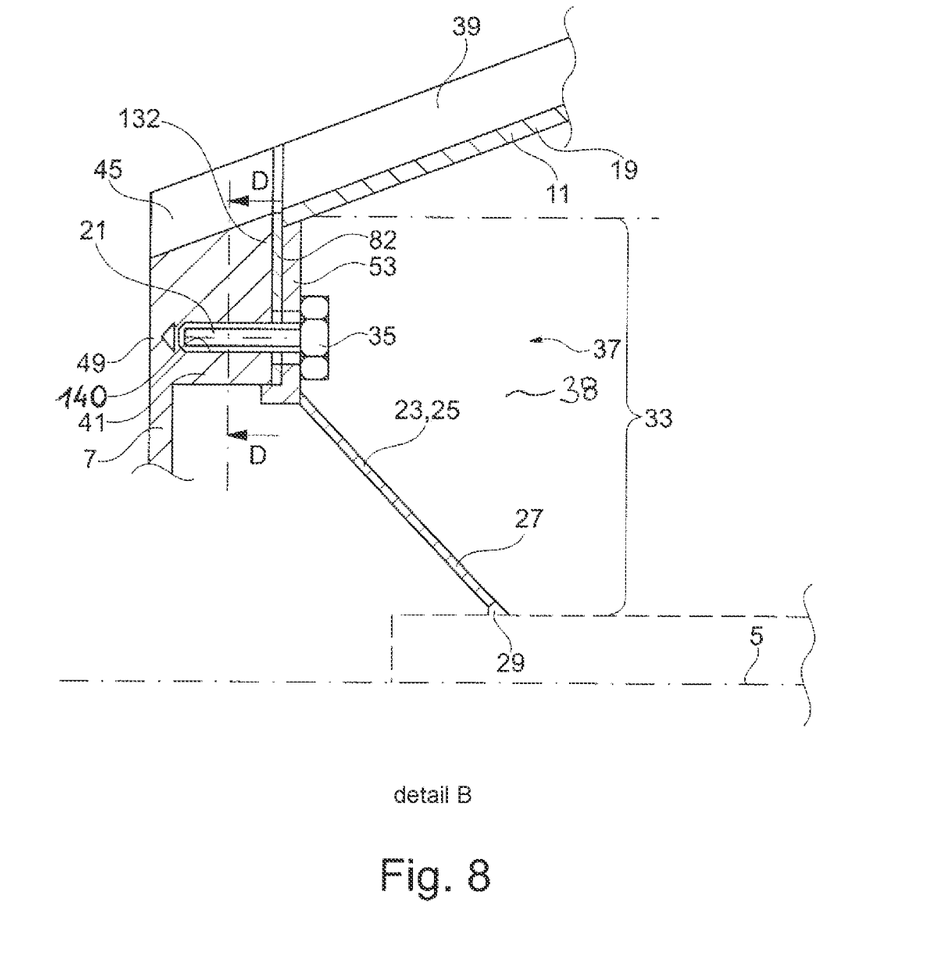
FIG. 8 shows an enlarged view of detail B of FIG. 4.
Figure 9:
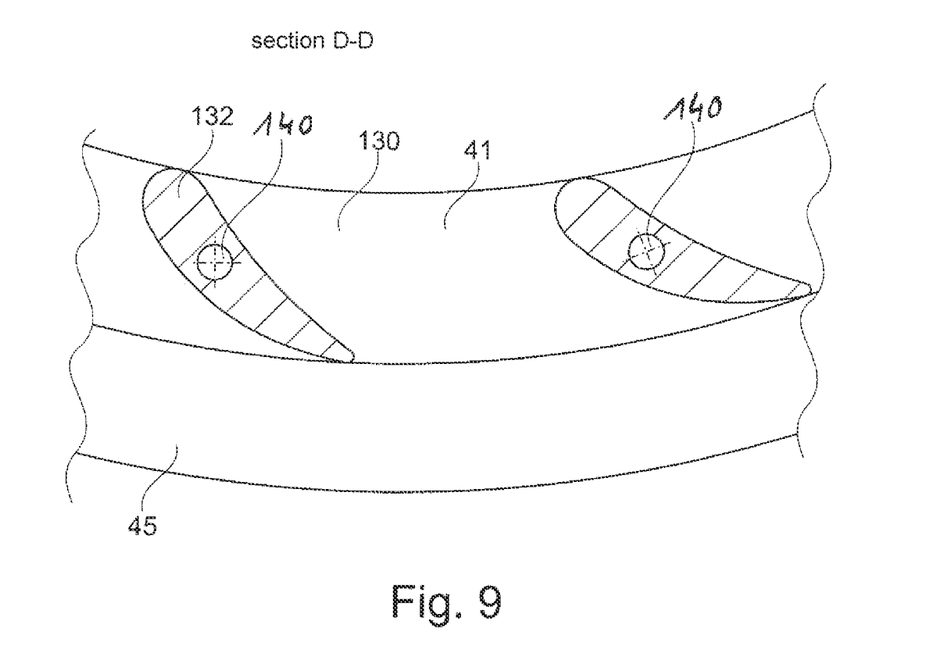
FIG. 9 shows a view along the line marked D-D in FIG. 5.

In the embodiment of FIGS. 7 to 9, the screw hub 7 and the material feed component 41 are materially integrally made as one component and/or in one piece (for example, cast) or are welded together, and the screw main body 11 and the annular-gap cover 23 are materially integrally made as one component and/or in one piece (for example, cast) or are welded together. The annular-gap cover 23 is formed as a cover body (constituting a filling distributor) 25 equipped with a conical circumferential wall 27, where a cover annular flange 53 extends integrally (e.g., in one piece) from this conical circumferential wall 27 radially outward, which is integrally connected (for example, materially cast in one piece or welded) to the screw main body 11.

In this embodiment, the material feed component 41 also forms the hub annular flange 49 of the screw hub 7 at the same time, in which threaded holes 140 are formed, into which the tightening means 21, configured as screws, can be screwed axially.

Furthermore, in this embodiment according to FIGS. 7 to 9, the annular-gap cover 23 extends integrally (e.g. in one piece) from the screw main body circumferential wall 19 of the screw main body 11 radially inward to (e.g., up to) the opening 29, whereby in this embodiment (as, for example, also in the embodiment of FIGS. 2 and 3) the annular-gap cover 23 is completely formed by the cover body (and/or the filling distributor, respectively) 25.

The annular gap 33 between an/the axial end 144, limiting the opening 29 and facing the second screw main body axial end portion 15, of the annular-gap cover 23 (and/or here of the cover body (and/or of the filling distributor) 25) and the screw main body circumferential wall 19 of the screw main body 11 serves as or forms at the same time the axial access channel 37 or at least a part of the axial access channel 37, via which the respective tool engagement portion 35 is accessible (for example, freely) from the second screw main body axial end portion 15 and which has its axial access opening 38 radially between the annular-gap cover 23 and the screw main body circumferential wall 19.

Furthermore, in this embodiment according to FIGS. 7 to 9, the screw overall body is divided into two parts, where a first part of the screw overall body is formed by the screw main body 11, which for this purpose is provided on its radially outer surface with the screw helix 39, and a second part of the screw overall body is formed by the material feed component 41, which is provided for this purpose on its radially outer surface with a screw helix portion 45 which, in the assembled state, fits together with the screw helix 39 of the screw main body 11, thereby forming an overall screw helix 39, 45.

The material feed component 41 is formed as a ring component, and, as can be seen from the sectional view through the material feed component (for example, through the filling lantern) 41 shown in FIG. 9, radial apertures 130 are formed in the material feed component (and thus in the ring component) 41, which apertures are spaced circumferentially, for example at regular intervals, from one another and are bounded by interposed webs 132 of the material feed component 41. The webs 132 are formed here as material accelerator blades (for example, in the form of pump impeller blades and/or pump impeller vanes), so that the material conveyed radially outward through the apertures 130 (and/or the suspension conveyed radially outward through the apertures 130) can be conveyed radially in an improved way. The webs 132 here thus also constitute material guide fins which correspond or may correspond to the material guide fins 43 of the embodiments of FIGS. 1 to 3. Radially on the outside of the material feed component 41, the material to be centrifuged is then conveyed axially to the screw main body 11 by means of the screw helix portion 45, which is co-rotated about the axial axis 5, from whose screw helix 39 it is then conveyed further axially in the direction to the second screw body axial end portion 15, in order to fall down there via gravity and be discharged from the screw centrifuge 1 in the direction of the arrow P4 (for example, via a solids discharge nozzle).

The guide component through-holes 86 are formed in the webs 132, through which the tightening means 21 extend and/or may extend axially.

The adjusting ring disk 82 is located between the material feed component 41, which is integrally formed with the screw hub 7, and the annular-gap cover 23 (or the cover body 25, which is designed as a filling distributor, or the cover annular flange 53).

LIST OF REFERENCE SIGNS 1 screw centrifuge
3 screw drive shaft
5 axial axis
7 screw hub
9 axial end
11 screw main body
13 first screw main body axial end portion
15 second screw main body axial end portion
17 second axial end
19 screw main body circumferential wall
21 tightening means
23 annular-gap cover
25 cover body
27 conical circumferential wall
29 central opening
31 feed line
33 annular gap
34 feed line end portion
35 tool engagement portion
37 axial access channel
38 axial access opening
39 screw helix
41 material feed guide component
43 material guide fins
45 screw helix portion
47 screw main body annular flange
49 hub annular flange
51 body through-holes
53 cover annular flange
70 screen drum
72 screen drum circumferential wall
74 screen means
76 drum drive shaft
80 radial gap
82 adjusting ring disk
84 disk through-holes
86 guide component through-holes
100 receiving housing
102 machine frame
104 pivot bearing
110 screen-type screw centrifuge system
112 holding part
114 first leg
116 second leg
118 base
120 holding piece
122 lifting device
130 radial apertures
132 webs
134 body apertures
140 threaded holes
144 axial end of the annular-gap cover

The invention claimed is:

1. A screen-type screw centrifuge comprising:
a screw drive shaft extending along an axial axis;
a screw hub fixed to an axial end of the screw drive shaft;
a hollow screw main body having a first screw main body axial end portion and a second screw main body axial end portion and which extends axially along the axial axis from the first screw main body axial end portion to the second screw main body axial end portion in the direction opposite to a second axial end of the screw drive shaft and which comprises a screw main body circumferential wall extending around the axial axis, wherein the hollow screw main body is detachably fixed at the first screw main body axial end portion to the screw hub with at least one tightening means by which the screw main body and the screw hub are tightened against each other; and
a ring-shaped annular-gap cover having a central opening for receiving a feed line for feeding material to be centrifuged into the interior of the screw main body and which extends from the screw main body circumferential wall to the central opening to cover an annular gap between the received feed line and the screw main body circumferential wall when the feed line is inserted into the opening, and
wherein the at least one tightening means has a tool engagement portion facing the second screw main body axial end portion,
wherein at least one axial access channel is formed radially between the screw main body circumferential wall and the annular-gap cover, through which the tool engagement portion of the at least one tightening means is axially accessible from the second screw main body axial end portion,
wherein the at least one tightening means is formed as an axial tightening means and the screw main body and the screw hub are placed axially one behind the other and are axially tightened to each other by the at least one axial tightening means,
wherein a screw main body annular flange is formed by and/or on the screw main body circumferential wall at the first screw main body axial end portion, which extends around the axial axis and via which the screw main body is detachably fixed at the first screw main body axial end portion to a hub annular flange of the screw hub, which extends around the axial axis,
wherein the screw main body annular flange and the hub annular flange are placed axially one behind the other and are axially tightened together by the at least one axial tightening means,
wherein the annular-gap cover includes a cover annular flange extending around the axial axis, the cover annular flange
is placed axially between the screw main body annular flange and the hub annular flange, and
is axially tightened together with the screw main body annular flange and the hub annular flange by the at least one axial tightening means,
wherein the annular-gap cover includes a hollow cylindrical or hollow conical cover body including a cover circumferential wall extending around the axial axis,
wherein the axial access channel is formed as an annular channel extending radially around the axial axis between the cover circumferential wall and the screw main body circumferential wall,
wherein the screen-type screw centrifuge further comprises a rotatably supported screen drum having a screen drum circumferential wall, by which the screw main body is surrounded around the axial axis and which is equipped with a screen, and having an adjusting ring disk which extends around the axial axis and which is axially placed between the screw main body annular flange and the hub annular flange, and by which a radial gap between the screw main body and the screen drum circumferential wall is adjustable, and wherein the adjusting ring disk is axially tightened by the at least one axial tightening means together with the screw main body and the screw hub, and together with the screw main body annular flange and the hub annular flange.

2. The screen-type screw centrifuge according to claim 1, wherein the axial access channel has an axial access opening which is disposed radially between the annular-gap cover and the screw main body circumferential wall and which axially faces the second screw main body axial end portion and which is radially overlapped at least partially with the tool engagement portion.

3. The screen-type screw centrifuge according to claim 1, wherein the at least one axial tightening means is formed as a screw which includes a screw head by which the tool engagement portion is formed.

4. The screen-type screw centrifuge according to claim 1, wherein the screw main body annular flange is formed as a screw main body annular flange extending radially inward with respect to the axial axis, and
wherein the hub annular flange is formed as a hub annular flange extending radially outward with respect to the axial axis.

5. The screen-type screw centrifuge according to claim 1, wherein the hollow screw main body is in the form of a hollow screw cone, and
wherein the first screw main body axial end portion is a small-diameter axial end portion of the screw cone and the second screw main body axial end portion is a large-diameter end portion of the screw cone.

6. The screen-type screw centrifuge according to claim 1, further comprising a separate, annular material feed guide component which extends around the axial axis and is configured to guide the material to be centrifuged, passing through the central opening, to an outer side of the screw main body, and
wherein the material feed guide component is axially placed between the screw main body and the screw hub and is axially tightened together with the screw main body and the screw hub by the at least one tightening means.

7. The screen-type screw centrifuge according to claim 6, wherein the material feed guide component is placed between the cover annular flange and the hub annular flange.

8. The screen-type screw centrifuge according to claim 1, further comprising the feed line for feeding material to be centrifuged into the interior of the screw main body, which is received in the central opening of the annular-gap cover, and
wherein the feed line includes a feed line end portion which extends parallel to the axial axis and with which the feed line is received in the central opening of the annular-gap cover.

9. A screen-type screw centrifuge system comprising:
a screen-type screw centrifuge which includes:
 a screw drive shaft extending along an axial axis,
 a screw hub fixed to an axial end of the screw drive shaft,
 a hollow screw main body which has a first screw main body axial end portion and a second screw main body axial end portion and which extends axially along the axial axis from the first screw main body axial end portion to the second screw main body axial end portion in the direction opposite to a second axial end of the screw drive shaft and which includes a screw main body circumferential wall extending around the axial axis, wherein the hollow screw main body is detachably fixed at the first screw main body axial end portion to the screw hub with at least one tightening means by which the screw main body and the screw hub are tightened against each other, and
 a ring-shaped annular-gap cover which has a central opening for receiving a feed line for feeding material to be centrifuged into the interior of the screw main body and which extends from the screw main body circumferential wall to the central opening to cover an annular gap between the received feed line and the screw main body circumferential wall when the feed line is inserted into the opening, and
 wherein the at least one tightening means has a tool engagement portion facing the second screw main body axial end portion, and
 wherein at least one axial access channel is formed radially between the screw main body circumferential wall and the annular-gap cover, through which the tool engagement portion of the at least one tightening means is axially accessible from the second screw main body axial end portion; and
a U- or V-shaped holding part which has a first leg and a second leg opposite thereto, which are connected to each other via a base, a holding piece for attachment to a lifting device is arranged on the first leg, and
wherein a transverse distance between the two legs in a direction transverse to a longitudinal extension thereof is greater than a radial distance between an inner wall of the screw main body and an outer surface of the screen-type screw centrifuge at an axial level of the screw main body, so that the second leg can engage axially into the interior of the screw main body from the second screw main body end portion and simultaneously the first leg can engage over the screen-type screw centrifuge, to thereby be able to deposit the screw main body on the second leg for a removal of the screw main body from the screen-type screw centrifuge.

10. A method of dismounting a screw main body from a screen-type screw centrifuge of a screen-type screw centrifuge system, wherein the screen-type screw centrifuge system includes
a screen-type screw centrifuge having:
 a screw drive shaft extending along an axial axis,
 a screw hub fixed to an axial end of the screw drive shaft,
 a hollow screw main body which has a first screw main body axial end portion and a second screw main body axial end portion and which extends axially along the axial axis from the first screw main body axial end portion to the second screw main body axial end portion in the direction opposite to a second axial end of the screw drive shaft and which comprises a screw main body circumferential wall extending around the axial axis, wherein the hollow screw main body is detachably fixed at the first screw main body axial end portion to the screw hub with at least one tightening means by which the screw main body and the screw hub are tightened against each other, and
 a ring-shaped annular-gap cover which has a central opening for receiving a feed line for feeding material to be centrifuged into the interior of the screw main body and which extends from the screw main body circumferential wall to the central opening to cover an annular gap between the received feed line and the screw main body circumferential wall when the feed line is inserted into the opening,
wherein the at least one tightening means has a tool engagement portion facing the second screw main body axial end portion, and
wherein at least one axial access channel is formed radially between the screw main body circumferential wall and the annular-gap cover, through which the tool engagement portion of the at least one tightening means is axially accessible from the second screw main body axial end portion; and
a U- or V-shaped holding part which has a first leg and a second leg opposite thereto, which are connected to each other via a base, a holding piece for attachment to a lifting device is arranged on the first leg, and
wherein a transverse distance between the two legs in a direction transverse to a longitudinal extension thereof is greater than a radial distance between an inner wall of the screw main body and an outer surface of the screen-type screw centrifuge at an axial level of the screw main body, so that the second leg can engage axially into the interior of the screw main body from the second screw main body end portion and simultaneously the first leg can engage over the screen-type screw centrifuge, to thereby be able to deposit the screw main body on the second leg for a removal of the screw main body from the screen-type screw centrifuge, the method comprising:
axially inserting a tool into the screw main body from the second screw main body axial end portion thereof into engagement with the tool receiving portion of the at least one tightening means;
releasing the at least one tightening means with the tool; and
axially removing the screw main body from the one axial end of the screw drive shaft and from the screen-type screw centrifuge in a direction opposite to the second axial end of the screw drive shaft, and
wherein the holding part with the second leg is inserted into the screw main body, and
wherein the first leg engages over the screw centrifuge, the screw main body is deposited on the second leg after the at least one tightening means has been released, and the holding part with the second leg and the screw main body deposited thereon is moved axially from the first end of the screw drive shaft in the direction opposite to the second axial end of the screw drive shaft, and the screw main body is thus removed axially from the screen-type screw centrifuge.

11. A screen-type screw centrifuge comprising:
a screw drive shaft extending along an axial axis;
a screw hub fixed to an axial end of the screw drive shaft;
a hollow screw main body which has a first screw main body axial end portion and a second screw main body axial end portion and which extends axially along the axial axis from the first screw main body axial end portion to the second screw main body axial end portion in the direction opposite to a second axial end of the screw drive shaft and which includes a screw main body circumferential wall extending around the axial axis, wherein the hollow screw main body is detachably fixed at the first screw main body axial end portion to the screw hub with at least one tightening means by which the screw main body and the screw hub are tightened against each other, wherein the at least one tightening means is formed as an axial tightening means and the screw main body and the screw hub are placed axially one behind the other and are axially tightened to each other by the at least one axial tightening means;
a ring-shaped annular-gap cover which has a central opening for receiving a feed line for feeding material to be centrifuged into the interior of the screw main body and which extends from the screw main body circumferential wall to the central opening to cover an annular gap between the received feed line and the screw main body circumferential wall when the feed line is inserted into the opening;
a rotatably supported screen drum comprising a screen drum circumferential wall, by which the screw main body is surrounded around the axial axis and which is equipped with a screen means; and
an interchangeable spacer ring having a thickness along the axial axis and which extends around the axial axis and which is axially placed between the screw main body and the screw hub, wherein a radial gap between the screw main body and the screen drum circumferential wall is determined by the thickness of the interchangeable spacer ring, wherein the interchangeable spacer ring is axially tightened by the at least one axial tightening means together with the screw main body and the screw hub, and
wherein the at least one tightening means has a tool engagement portion facing the second screw main body axial end portion,
wherein at least one axial access channel is formed radially between the screw main body circumferential wall and the annular-gap cover, through which the tool engagement portion of the at least one tightening means is axially accessible from the second screw main body axial end portion,
wherein the hollow screw main body is in the form of a hollow screw cone, and
wherein the first screw main body axial end portion is a small-diameter axial end portion of the screw cone, and the second screw main body axial end portion is a large-diameter end portion of the screw cone.

12. The screen-type screw centrifuge according to claim 11, wherein a screw main body annular flange is formed by and/or on the screw main body circumferential wall at the first screw main body axial end portion, which extends around the axial axis and via which the screw main body is detachably fixed at the first screw main body axial end portion to a hub annular flange of the screw hub, which extends around the axial axis, and
wherein the screw main body annular flange and the hub annular flange are placed axially one behind the other and are axially tightened together by the at least one axial tightening means.

13. The screen-type screw centrifuge according to claim 12, wherein interchangeable spacer ring is axially placed between the screw main body annular flange and the hub annular flange, and
wherein the interchangeable spacer ring is axially tightened with the at least one axial tightening means together with the screw main body annular flange and the hub annular flange.

14. The screen-type screw centrifuge according to claim 12, further comprising a separate, annular material feed guide component which extends around the axial axis and which is configured to guide the material to be centrifuged, passing through the central opening, to an outer side of the screw main body, wherein the material feed guide component is axially placed between the screw main body and the screw hub and is axially tightened together with the screw main body and the screw hub by the at least one tightening means, and wherein the material feed guide component is placed between the interchangeable spacer ring and the hub annular flange.

15. The screen-type screw centrifuge according to claim 11, wherein the at least one axial tightening means is formed as a screw which includes a screw head by which the engagement portion is formed.

16. The screen-type screw centrifuge according to claim 11, further comprising a separate, annular material feed guide component which extends around the axial axis and which is configured to guide the material to be centrifuged, passing through the central opening, to an outer side of the screw main body, wherein the material feed guide component is axially placed between the screw main body and the screw hub and is axially tightened together with the screw main body and the screw hub by the at least one tightening means, and wherein the material feed guide component is placed between the interchangeable spacer ring and the screw hub.

* * * * *